United States Patent [19]

Schöb et al.

[11] Patent Number: 5,519,615

[45] Date of Patent: May 21, 1996

[54] METHOD FOR DETERMINING THE SPEED VARIATION BETWEEN WHEELS OF DIFFERENT AXLES OF A VEHICLE

[75] Inventors: Reinhold Schöb, Filderstadt; Bernd Scharnowski, Fellbach; Gerd Eilert, Schwaikheim; Volker Maass, Stuttgart, all of Germany

[73] Assignee: Mercedes-Benz AG, Germany

[21] Appl. No.: 8,819

[22] Filed: Jan. 25, 1993

[30] Foreign Application Priority Data

Jan. 23, 1992 [DE] Germany ............... 42 01 675.4

[51] Int. Cl.$^6$ .................................................. B60K 11/00
[52] U.S. Cl. ........................................................ 364/426.01
[58] Field of Search ..................... 364/426.01, 426.02, 364/426.03, 424.05; 180/197, 233, 245, 249

[56] References Cited

U.S. PATENT DOCUMENTS

| | | | |
|---|---|---|---|
| 4,754,834 | 7/1988 | Ozaki et al. | 180/233 |
| 4,874,056 | 10/1989 | Naito | 180/233 |
| 4,921,065 | 8/1990 | Hamada et al. | 180/245 |
| 4,953,654 | 9/1990 | Imaseki et al. | 180/197 |
| 4,966,249 | 10/1990 | Imaseki | 180/233 |
| 5,079,708 | 1/1992 | Brown | 364/424.05 |
| 5,090,510 | 2/1992 | Watanabe et al. | 180/197 |
| 5,164,903 | 11/1992 | Lin et al. | 364/426.03 |
| 5,197,566 | 3/1993 | Watanabe et al. | 180/249 |
| 5,251,719 | 10/1993 | Eto et al. | 180/197 |
| 5,272,635 | 12/1993 | Nakayama | 364/426.02 |
| 5,303,797 | 4/1994 | Niikura | 180/248 |

FOREIGN PATENT DOCUMENTS

| | | |
|---|---|---|
| 3505455 | 8/1986 | Germany. |
| 3818511A1 | 12/1988 | Germany. |
| 3923782 | 1/1990 | Germany. |

*Primary Examiner*—Kevin J. Teska
*Assistant Examiner*—Stephen J. Walder, Jr.
*Attorney, Agent, or Firm*—Evenson, McKeown, Edwards & Lenahan

[57] ABSTRACT

An improved method is used to determine speed variation between wheels of different axles of a vehicle. The difference between the speeds of the rear wheels and the speeds of the front wheels is formed, and a correction is determined which compensates for the variations between the speeds of the front wheels and the rear wheels arising because of the vehicle geometry. The speed variation between the wheels of different axles of a vehicle is given by the difference plus the correction and, under particular driving conditions, which are characterized at least in that the acceleration of the rear wheels is below a threshold value at which there is no speed difference between the wheels of different axles because of drive slip, an adaptation of the correction takes place by determining the difference between the speeds of the rear wheels and the front wheels and by adapting the correction in such a way that the correction, under the particular driving conditions, is equal with respect to magnitude to the difference between the speeds of the rear wheels and the front wheels and exhibits a change of sign relative to this difference. In addition, or alternatively, in determining the correction, the vehicle transverse acceleration is taken into account by the magnitude of the correction becoming smaller with increasing transverse acceleration.

13 Claims, 4 Drawing Sheets

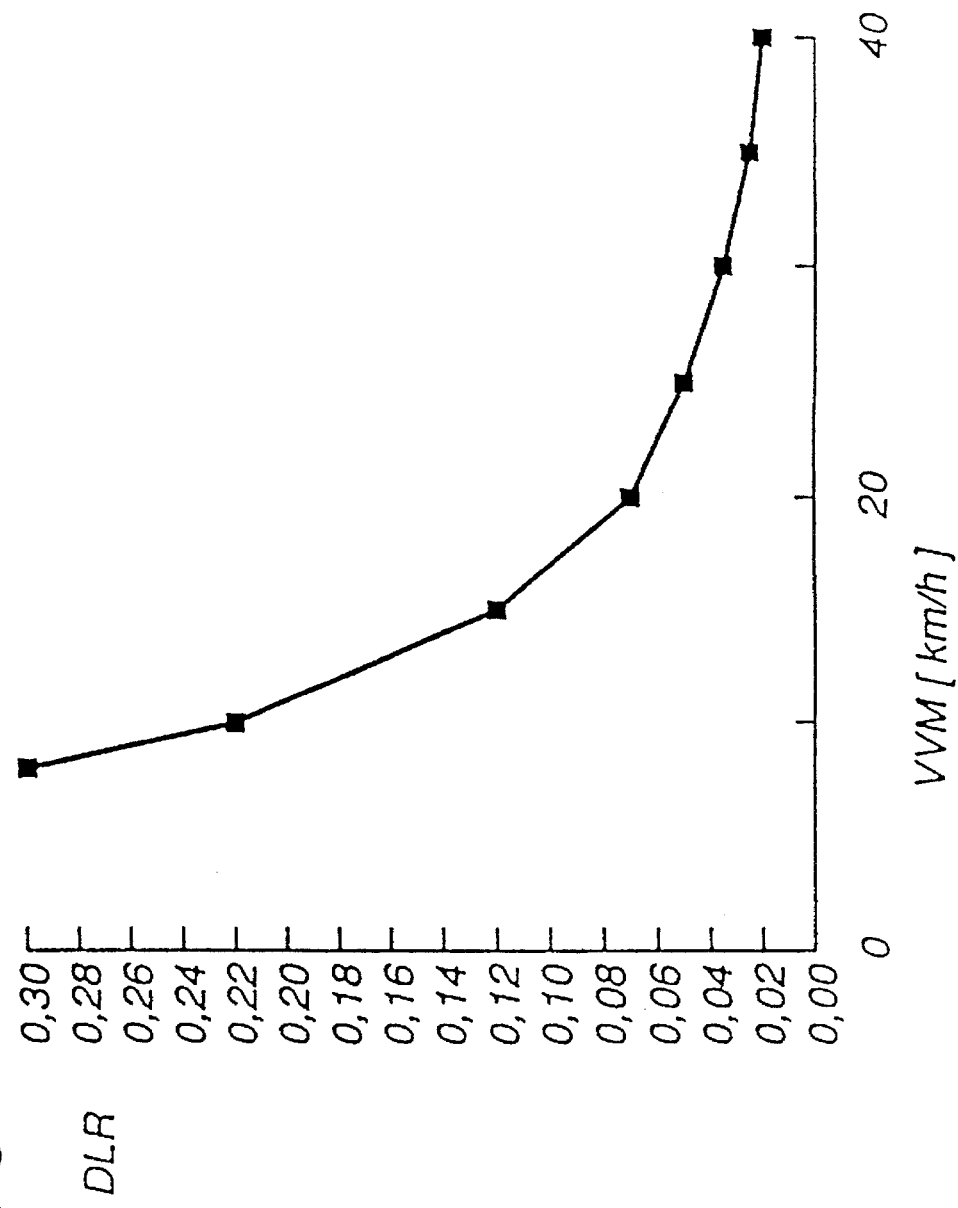

METHOD FOR DETERMINING THE SPEED VARIATION BETWEEN WHEELS OF DIFFERENT AXLES OF A VEHICLE

BACKGROUND AND SUMMARY OF THE INVENTION

The present invention relates to a method for determining the speed variation between wheels of different vehicle axles, and, more particularly, to a method of forming a difference between speeds of rear wheels and speeds of front wheels, determining a correction which compensates for the variations between the speeds of the front wheels and the rear wheels arising from vehicle geometry, and providing to a vehicle system the speed variation between the wheels of the separate vehicle axles in terms of the difference plus the correction.

A method is disclosed in DE 35 05 455 A1 which gives an equation by way of which the speed variation of the rear wheels relative to the front wheels is determined. In particular, the difference is first determined between the speed of the rear wheels and an average speed of the front wheels. This known method also takes account of understeer and oversteer behavior when the vehicle is travelling around a curve by introducing a correction value which is referred to as the Ackermann correction which is a function of the difference between the front-wheel speeds, which is multiplied by the speed of the rear wheels. The speed variation DV of the rear wheels relative to the front wheels is then determined from the following equation:

$$D = VHM - VVM + VHM*f(DLA)$$

where VHM is the average speed of the wheels of the rear axle wheels, VVM is the average speed of the front-axle wheels, DLA is the difference between the speeds of the front wheels and f(DLA) is the function used for making the correction.

In the determination of wheel slip, it is also known to take account of the situation when the vehicle is travelling around a curve (as discussed in DE 39 23 782 A1), but in this method, the Ackermann correction is not made and account is only taken, for each axle individually, of the higher speed of the wheel on the outside of the curve due to the fact that the vehicle is travelling around the curve.

Relative to this state of the known art, it is an object of the present invention to improve the applicability and mode of operation of the above-described method. This object has been achieved in accordance with the present invention by providing that under particular driving conditions which are characterized at least in that acceleration of the rear wheels is below a threshold value and that the vehicle is travelling around a curve, such that no speed difference of the wheels of separate vehicle axles due to drive slip exists, an adaptation of the correction takes place by determining the difference between the speeds of the rear wheels and the front wheels and by adapting the correction so that a magnitude of the correction, under the particular driving conditions, is equal to the difference between the speeds of the rear wheels and the front wheels and the correction exhibits a change of sign relative to this difference and also further that in the step of determining the correction, transverse vehicle acceleration is taken into account by magnitude of the correction becoming smaller with increasing transverse acceleration.

An advantage of the present invention resides in the fact that both the applicability and mode of operation of the method are improved in a combination of two embodiments.

In the method according to the present invention which is employed in conventional electronic equipment associated with known sensors for determining wheel speeds, it is not only the speed differences resulting from the vehicle geometry which are taken into account in a particularly advantageous manner, but also those speed differences which arise because of the vehicle dynamics are accounted for. With increasing transverse acceleration, the path radii of the front and rear axles approach one another because of the changing drift angle. This means that because of the vehicle dynamics, there should be no correction in the case of large transverse accelerations because vehicle dynamics provide compensation for the effect of the vehicle geometry.

In what follows, the relationships are described for a vehicle which has a driven rear axle in normal driving operation. The present invention can be used in a particularly advantageous manner in all vehicle systems in which the slip between the axles of the vehicle is evaluated for the fulfillment of their function, such as automatically switching on a limited-slip differential between the axles of the vehicle or automatically selecting all-wheel drive in the case of slip control (acceleration skid regulation ASR). All the speeds should, furthermore, be considered in terms of km/h units where orders of magnitude are given.

BRIEF DESCRIPTION OF THE DRAWINGS

These and further objects, features and advantages of the present invention will become more readily apparent from the following detailed description of a currently preferred embodiment when taken in conjunction with the accompanying drawings wherein:

FIG. 5 is a graphical representation illustrating the way in which the parameter DLR (difference between the front-wheel speeds referred to the average front-wheel speed) depends on the vehicle speed, which is represented by the average front-wheel speed, in order to derive a transverse acceleration.

DETAILED DESCRIPTION OF THE DRAWINGS

Figure 1:
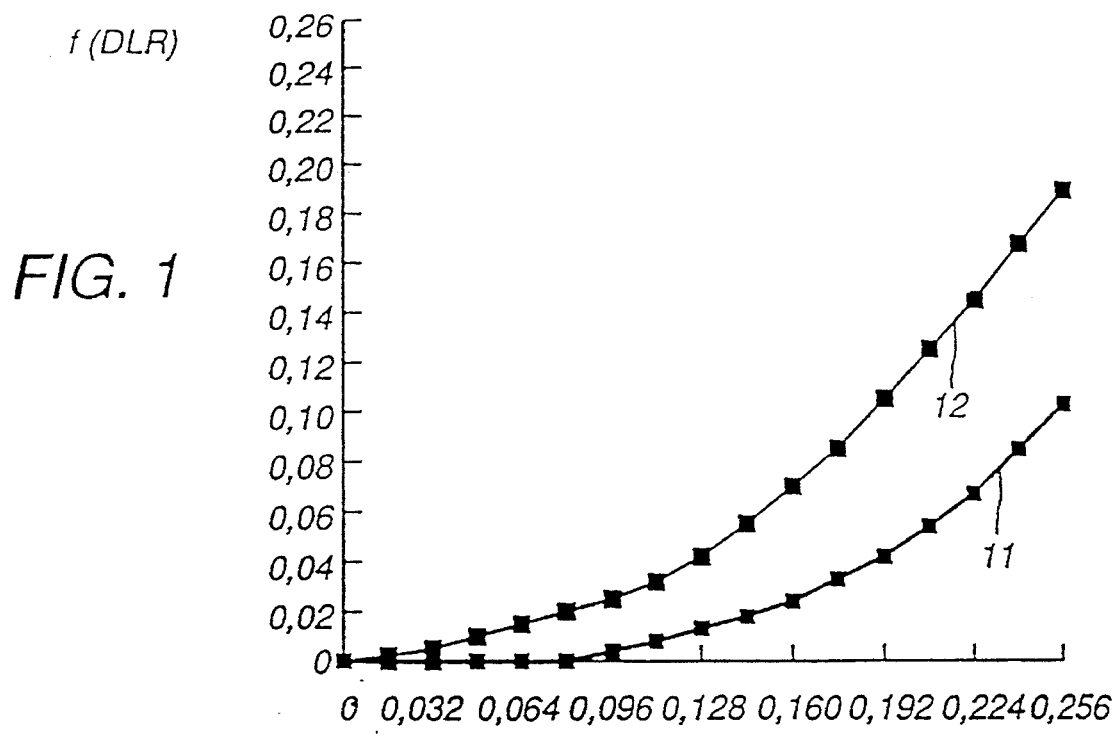
FIG. 1 is a graphic representation of the correction function f(DLR) plotted against the difference (DLR) between the speeds of the front wheels referred to the average front-wheel speed.

As may be seen from FIG. 1, the correction function f(DLR) used for correction can be subject to fluctuations depending on the type of vehicle. The parameter DLR is the difference between the speeds of the front wheels referred to the average front-wheel speed VVM. The fluctuations in the correction function f(DLR) are mainly due to the fact that the correction function f(DLR) is a measure of the speed variations between the front wheels and the rear wheels arising due to the fact that the vehicle is travelling around a curve. This means that the variation of the correction function f(DLR) mainly depends on the wheel base, the track width and the steering geometry of the vehicle. FIG. 1 shows, as an example, the curves of two correction functions f(DLR) for two types of vehicle in which the correction function f(DLR), designated by numeral 11, characterizes differences in track width and/or wheel base compared with the correction function f(DLR) designated by numeral 12.

Figure 2:
FIG. 2 is a graphic representation of an improvement function h(VVM) plotted against vehicle speed.

The vehicle dynamics can now be taken into account by adding a further improvement function h(VVM) to the known equation. The parameter VVM is the average speed of the front wheels. A possible curve of the improvement function h(VVM) is shown in FIG. 2 for the two vehicles for which the correction functions f(DLR) have already been represented in FIG. 1. It may seen from FIG. 2 that the curve of the improvement function h(VVM) is identical for the two vehicle types (curve 201). The correction by way of the improvement function h(VVM) takes place by modifying the known equation into the following form:

$$DV=VHM-VVM+VVM*f(DLR)*h(VVM).$$

The parameter DV is the speed variation in km/h of the rear wheels relative to the front wheels. The parameter VHM is the average rotational speed of the rear wheels. The fact that the vehicle is travelling around a curve is taken into account by the correction function f(DLR). The utilization of such an equation takes account of the fact that the path radii of the front and rear axles approach one another with increasing transverse acceleration $a_q$ because of the changing drift angle. This means that because of the vehicle dynamics, there should be no correction in the case of large transverse accelerations $a_q$ because compensation for the effect of the vehicle geometry is then provided by the vehicle dynamics. This employment of the improvement function h(VVM) therefore ensures that in the case of high vehicle speeds, which lead to large transverse accelerations $a_q$ when the vehicle is travelling around a curve, the correction disappears. In principle, there are other ways of achieving the correction. The only important point is, however, that the correction should disappear with increasing transverse acceleration $a_q$. The corresponding use of the improvement function h(VVM) therefore only represents one non-limiting embodiment for achieving the object of the present invention.

Figure 3:
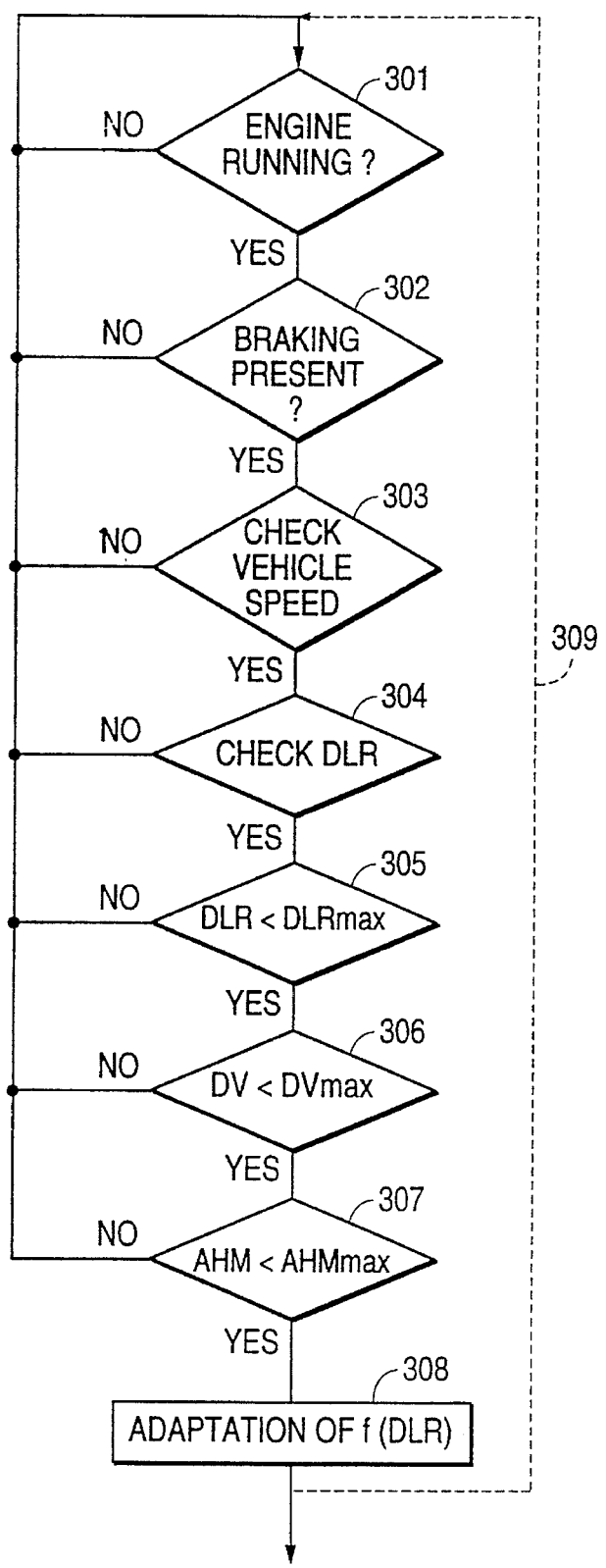
FIG. 3 is a flow chart of an adaption of the correction function f(DLR) to a particular vehicle in accordance with the present invention.

FIG. 3 shows an embodiment of an adaptation of the correction function f(DLR) to a particular vehicle. This adaptation takes place in such a way that a certain model function $f(DLR)_{model}$ is stored. This model function $f(DLR)_{model}$ corresponds to an average model function $f(DLR)_{model}$ to be used as the correction function for the correction function f(DLR) determined on individual vehicles. This model function is then adapted under particular driving conditions.

These particular driving conditions are checked in the steps 301 to 307 in the embodiment of FIG. 3. Step 301 checks whether the engine is running. If this is the case, transition occurs to the check corresponding to step 302. Otherwise, the course of the method is interrupted. Step 302 checks whether a braking procedure is present. If this is the case, the course of the method is interrupted in order to avoid erroneous adaptation due to any brake slip which may possibly arise. Otherwise, transition occurs to step 303 which checks whether the vehicle speed, which corresponds to the average front-wheel speed VVM, is within a particular speed range in which it may be expected that the correction is also effective, i.e. that the product of the correction function f(DLR) and the parameter VVM, and the improvement function h(VVM) is not equal to 0. In accordance with the representation in FIG. 2, a suitable speed range for the parameter VVM is between 5 km/h and 40 km/h. If the parameter VVM is within the particular speed range, transition occurs to step 304; otherwise, the course of the method is interrupted. Step 304 then checks whether the parameter DLR has exceeded a certain minimum magnitude. As may be seen from FIG. 1, the value of the correction function f(DLR) only exhibits a value greater than 0 when DLR is greater than 0. Thus, for a correction to be particular threshold value $DLR_{min}$, which can for example be effective, it is therefore necessary for DLR to be above a 0.096. If the parameter DLR is above the particular threshold value $DLR_{min}$, step 305 then checks whether the parameter DLR is below a further threshold value $DLR_{max}$. If the parameter DLR is below the further threshold value $DLR_{max}$ (which means that the transverse acceleration $a_q$ is below a threshold value $a_{qmax}$), transition occurs to step 306. Otherwise, the course of the method is interrupted. The parameter $DLR_{max}$ can also depend, in an advantageous manner, on the average speed VVM of the front wheels, as is shown in FIG. 5. Step 306 then checks whether the speed variation DV of the rear wheels (driven wheels) referred to the front wheels (non-driven wheels), the variation DV being directly determined from the measured speeds of the rear wheels and the front wheels, is below a threshold value $DV_{max}$, which can have the order of magnitude of 2 km/h. If this is the case, transition occurs to step 307. Otherwise, the course of the method is interrupted. Step 307 checks whether the acceleration AHM of the rear wheels is below a threshold value $AHM_{max}$. The acceleration AHM of the rear wheels can then be obtained from the differential coefficient with respect to time of the parameter VHM. An order of magnitude for the threshold value $AHM_{max}$ can be some 0.5 m/s$^2$. The checks corresponding to steps 306 and 307 are carried out in order to prevent adaptation if a large drive slip is present. If the interrogation at step 307 is answered in the affirmative, an adaptation is carried out in step 308. Otherwise, the course of the method is interrupted.

The adaptation of the correction function f(DLR) in step 308 can take place by making the values of the model function $f(DLR)_{model}$ stored at the interpolation points of the model $f(DLR)_{model}$ equal point by point to the values of the correction function f(DLR) which result on the basis of the driving conditions present. The adaptation is complete when the adaptation has taken place at all the interpolation points, i.e. the deviations converge towards 0. This means then that the particular driving conditions must be repeatedly present so that adaptation can be carried out at different values of DLR (309). As an alternative to this, a factor can be determined, at one interpolation point, by which the value of the model function $f(DLR)_{model}$ at that particular interpolation point has to be multiplied in order to obtain the value of the correction function f(DLR) arising in accordance with the driving conditions present. Complete adaptation can then take place by multiplying the values of the model function $f(DLR)_{model}$ at the other interpolation points by the same factor.

This adaptation can, of course, also take place when the improvement function h(VVM) does not appear in the equation. The adaptation of the model function $f(DLR)_{model}$ at an individual interpolation point then takes place in such a way that it can be deduced from the particular driving conditions, which are checked in steps 301 to 307, that driving conditions are present on the basis of which there is no speed difference between the rear wheels and the front wheels attributable to drive slip at the rear wheels. The rotational speed differences between the rear wheels and the front wheels are then due, under these driving conditions, to the effects described for a vehicle travelling around a curve. The adaptation, therefore, then takes place such that the value of DV to be achieved as a result is zero. This means that the parameter f(DLR)*h(VVM)*VVM is equal to the difference VHM−VVM with respect to magnitude and exhibits a change of sign relative to this difference.

Figure 4:
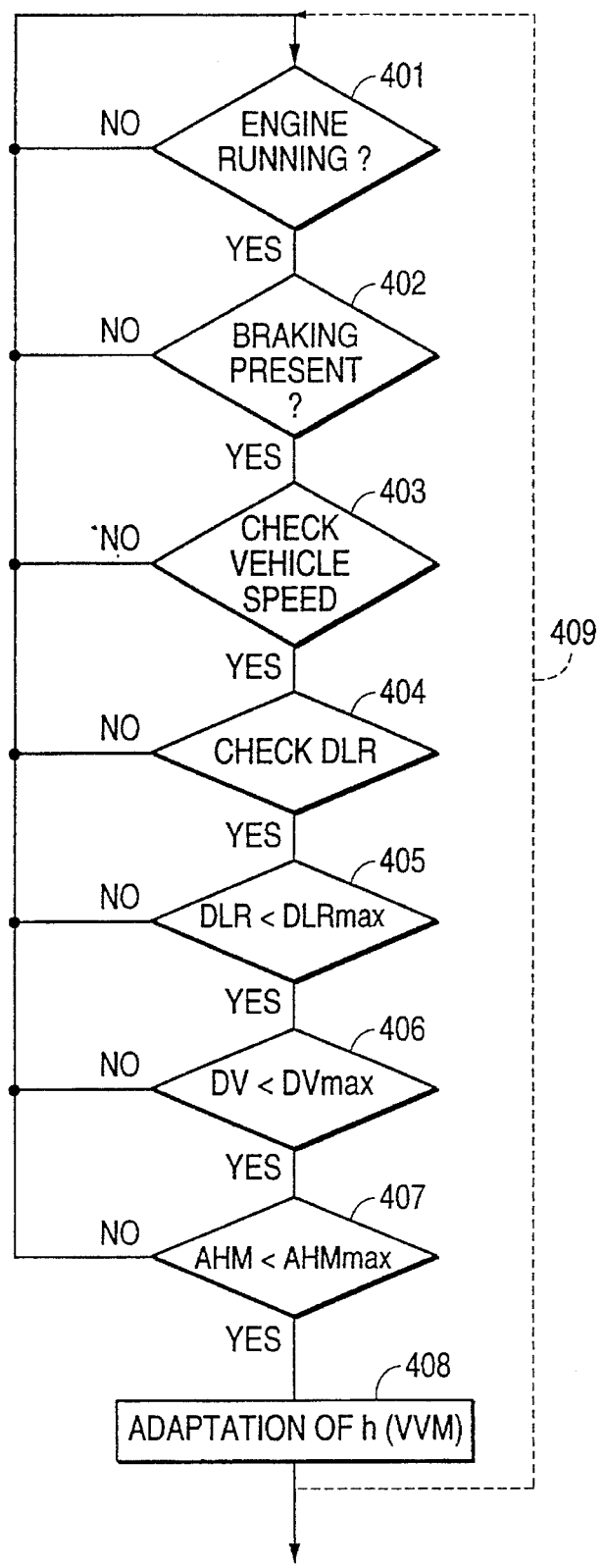
FIG. 4 is a flow chart of an adaptation of the improvement function h(VVM) to a particular vehicle in accordance with the present invention.

It may be seen from FIG. 2 that the improvement function h(VVM) follows, at least approximately, the same curve for different vehicle types. An adaptation of this function can therefore take place in accordance with the embodiment of FIG. 4 so that the adaptation of the correction function f(DLR) subject to larger deviations is concluded. So that the possible deviations of the correction function f(DLR) and the improvement function h(VVM) can be separated during these adaptations, the speed range to be checked in step 303 is narrowed so that this speed range is, for example, between 5 km/h and up to 10–15 km/h. In the adaptation of the model function $f(DLR)_{model}$, it is essential that possible fluctuations of the improvement function h(VVM), in accordance with the representation in FIG. 2, should be small because the improvement function h(VVM) is initially flat and then becomes steeper with increasing speed until the value of the improvement function h(VVM) becomes 0 at speeds greater than 50 km/h. In the course of the method of FIG. 4, the checks made in steps 401–407 correspond to the checks made in steps 301–307, which have been described in association with FIG. 3. The adaptation of the improvement function h(VVM) then takes place in step 408 by analogy with the adaptation of the correction function f(DLR) corresponding to the description of step 308.

FIG. 5 shows the curve of a function of the parameter DLR plotted against the parameter VVM. This function characterizes the change in the parameter DLR as the parameter VVM changes at a constant transverse acceleration $a_q$. In FIG. 5, this transverse acceleration $a_q$ characterizes the threshold value $a_{qmax}$ of FIG. 3. This threshold value $a_{qmax}$ can be 1.5 m/s².

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for determining speed variation between driven and undriven wheels of vehicle axles, comprising the steps of sensing speeds of front and rear vehicle wheels, forming a difference between the speeds of the rear wheels and of the front wheels, determining a correction factor which compensates for the variations between the speeds of the front wheels and the rear wheels arising from vehicle geometry, and providing to a vehicle system the speed variation between the speed of driven and undriven vehicle axles in terms of the difference plus the correction factor, wherein, in the step of determining the correction factor, vehicle dynamics are taken into account by reducing a magnitude of the correction factor with increasing transverse acceleration.

2. The method according to claim 1, wherein a difference represented by DV is determined from the following equation:

$$DV=VHM-VVM+h(VVM)*f(DLR)*VVM,$$

where VHM and VVM represent the speeds of the rear wheels and the front wheels, respectively DLR represents the difference between the front-wheel speeds referred to the average front-wheel speed VVM and an improvement function represented by h(VVM) tends asymptotically to zero so that the correction represented by h(VVM),f(DLR),VVM also tends asymptotically to zero.

3. The method according to claim 2, wherein under particular driving conditions characterized at least in that acceleration of the rear wheels is below a threshold value and the vehicle is travelling around a curve, such that the speed difference of the wheels of the separate vehicle axles due to drive/slip does not exist, an adaptation of the correction takes place in which values of a model function are stored at particular interpolation points, the model function being a function averaged from the improvement function determined for individual vehicle types, and the adaptation of the correction function initially takes place at lower front wheel speeds and in which, at the interpolation points of the value of the front wheel speeds, at which the value of the model function is stored, the value of the improvement function is then determined such that the correction is equal in magnitude to the difference, the sign of the correction being reverse to the sign of the difference and the specific value of the improvement function.

4. The method according to claim 2, wherein under particular driving conditions characterized at least in that the acceleration of the rear wheels is below a threshold value and the vehicle is travelling around a curve such that a speed difference of the wheels of the separate vehicle axles due to drive slip does not exist, an adaptation of the correction takes place in which values of a model function are stored at particular interpolation points, the model function being a function averaged from improvement functions determined for individual vehicle types, and the adaptation of the correction function initially takes place at lower front wheel speeds and an adaptation of the improvement function then takes place in which, at one interpolation point of the value of the front wheel speeds at which the value of the model function is stored, a factor is determined such that the value of the model function at this interpolation point multiplied by the factor gives a value of the improvement function such that the correction is equal in magnitude to the difference, the sign of the correction being the reverse to the sign of the difference and the adapted values of the improvement function at the other interpolation points VVM being obtained by multiplying the values of the model function at the other interpolation points by the factor.

5. A method for determining speed variation between driven and undriven wheels of vehicle axles, comprising the steps of sensing speeds of front and rear vehicle wheels, forming a difference between the sensed speeds of the rear wheels and of front wheels, determining a correction factor which compensates for the variations between the speeds of the front wheels and the rear wheels arising from vehicle geometry, and providing to a vehicle system the speed variation between the wheels of the vehicle axles in terms of the difference plus the correction factor, wherein, under particular driving conditions in which acceleration of the driven wheels is below a threshold value and that the vehicle is travelling around a curve to produce transverse vehicle acceleration such that no speed difference of the wheels of separate vehicle axles due to drive slip exists, the correction arising from vehicle geometry is modified inversely to an increase in the transverse vehicle acceleration arising from vehicle dynamics, and wherein the correction as modified exhibits a change of sign relative to the difference.

6. The method according to claim 5, wherein the step of determining the difference represented as DV is based on the following equation:

$$DV = VHM - VVM + f(DLR) * VVM,$$

where VHM is the speed of the rear wheels, DLR is a difference between the front-wheel speeds referred to the average front-wheel speed represented by VVM, values of a model function represented by $f(DLR)_{model}$ are stored at particular interpolation points represented by DLR, the model function $f(DLR)_{model}$ being a function averaged from correction functions represented by f(DLR) determined for individual vehicle types, and the adaptation of the correction takes place by an adaptation of the correction function f(DLR) in which the value of the correction function f(DLR) is determined, at the interpolation points of the value DLR at which the value of the model function $f(DLR)_{model}$ is stored, such that the correction represented by f(DLR)*VVM is equal with respect to magnitude to the difference VHM−VVM, the sign of the correction being reverse to the sign of the difference and the particular value of the correction function f(DLR) being the adapted value of the model function $f(DLR)_{model}$.

7. The method according to claim 5, wherein the step of determining the difference represented by DV is based on the following equation:

$$DV = VHM - VVM + f(DLR) * VVM,$$

where VHM is the speed of the rear wheels, DLR is the difference between the front-wheel speeds referred to the average front-wheel speed represented by VVM, in that values of a model function represented by $f(DLR)_{model}$ are stored at particular interpolation points represented by DLR, the model function $f(DLR)_{model}$ being a function averaged from correction functions f(DLR) determined for individual vehicle types, and the adaptation of the correction takes place by an adaptation of the correction function f(DLR) in which a factor is determined, at one interpolation point of the value DLR at which the value of the model function $f(DLR)_{model}$ is stored, such that the value of the model function $f(DLR)_{model}$ at this interpolation point multiplied by the factor gives a value of the correction function f(DLR) such that the correction represented by f(DLR)*VVM is equal with respect to magnitude to the difference VHM−VVM, the sign of the correction being reverse to the sign of the difference and the adapted values of the correction function f(DLR) at the other interpolation points DLR being obtained by multiplying the values of the model function $f(DLR)_{model}$ at the other interpolation points by the factor.

8. The method according to claim 5, wherein the particular driving conditions includes at least one of the following conditions:

(a) a vehicle engine is running,
(b) a braking procedure is not taking place,
(c) vehicle speed is within a particular speed range,
(d) vehicle transverse acceleration is below a particular threshold value, and
(e) a variation between the speeds of the rear wheels and the front wheels is below a threshold value.

9. The method according to claim 8, wherein the step of determining the difference represented as DV is based on the following equation:

$$DV = VHM - VVM + f(DLR) * VVM,$$

where VHM is the speed of the rear wheels, DLR is a difference between the front-wheel speeds referred to the average front-wheel speed represented by VVM, values of a model function represented by $f(DLR)_{model}$ are stored at particular interpolation points represented by DLR, the model function $f(DLR)_{model}$ being a function averaged from correction functions represented by f(DLR) determined for individual vehicle types, and the adaptation of the correction takes place by an adaptation of the correction function f(DLR) in which the value of the correction function f(DLR) is determined, at the interpolation points of the value DLR at which the value of the model function $f(DLR)_{model}$ is stored, such that the correction represented by f(DLR)*VVM is equal with respect to magnitude to the difference VHM−VVM, the sign of the correction being reverse to the sign of the difference and the particular value of the correction function f(DLR) being the adapted value of the model function $f(DLR)_{model}$.

10. The method according to claim 8, wherein the step of determining the difference represented by DV is based on the following equation:

$$DV = VHM - VVM + f(DLR) * VVM,$$

where VHM is the speed of the rear wheels, DLR is a difference between the front-wheel speeds referred to the average front-wheel speed represented by VVM, in that values of a model function represented by $f(DLR)_{model}$ are stored at particular interpolation points represented by DLR, the model function $f(DLR)_{model}$ being a function averaged from correction functions f(DLR) determined for individual vehicle types, and the adaptation of the correction takes place by an adaptation of the correction function f(DLR) in which a factor is determined, at one interpolation point of the value DLR at which the value of the model function $f(DLR)_{model}$ is stored, such that the value of the model function $f(DLR)_{model}$ at this interpolation point multiplied by the factor gives a value of the correction function f(DLR) such that the correction represented by f(DLR)*VVM is equal with respect to magnitude to the difference VHM−VVM, the sign of the correction being reverse to the sign of the difference and the adapted values of the correction function f(DLR) at the other interpolation points DLR being obtained by multiplying the values of the model function $f(DLR)_{model}$ at the other interpolation points by the factor.

11. The method according to claim 8, wherein a difference represented by DV is determined from the following equation:

$$DV = VHM - VVM + h(VVM) * f(DLR) * VVM,$$

where VHM and VVM represent the speeds of the rear wheels and the front wheels, respectively DLR represents the difference between the front-wheel speeds referred to the average front-wheel speed VVM and an improvement function represented by h(VVM) tends asymptotically to zero so that the correction represented by h(VVM)*f(DLR)*VVM also tends asymptotically to zero.

12. The method according to claim 11, wherein under particular driving conditions characterized at least in that acceleration of the rear wheels is below a threshold value and the vehicle is travelling around a curve, such that the speed difference of the wheels of the separate vehicle axles due to drive/slip does not exist, an adaptation of the correction takes place in which values of a model function are stored at particular interpolation points, the model function being a function averaged from the improvement function determined for individual vehicle types, and the adaptation of the correction function initially takes place at lower front wheel speeds and in which, at the interpolation points of the value of the front wheel speeds, at which the value of the model function is stored, the value of the improvement function is then determined such that the correction is equal in magnitude to the difference, the sign of the correction being reverse to the sign of the difference and the specific value of the improvement function.

13. The method according to claim 11, wherein under particular driving conditions characterized at least in that the acceleration of the rear wheels is below a threshold value and the vehicle is travelling around a curve such that a speed difference of the wheels of the separate vehicle axles due to drive slip does not exist, an adaptation of the correction takes place in which values of a model function are stored at particular interpolation points, the model function being a function averaged from improvement functions determined for individual vehicle types, and the adaptation of the correction function initially takes place at lower front wheel speeds and an adaptation of the improvement function then takes place in which, at one interpolation point of the value of the front wheel speeds at which the value of the model function is stored, a factor is determined such that the value of the model function at this interpolation point multiplied by the factor gives a value of the improvement function such that the correction is equal in magnitude to the difference, the sign of the correction being the reverse to the sign of the difference and the adapted values of the improvement function at the other interpolation points VVM being obtained by multiplying the values of the model function at the other interpolation points by the factor.

\* \* \* \* \*